March 5, 1935. G. DELPECH 1,992,994
METHOD FOR THE MANUFACTURE OF GLASS AND SIMILAR PRODUCTS
Filed Feb. 1, 1933
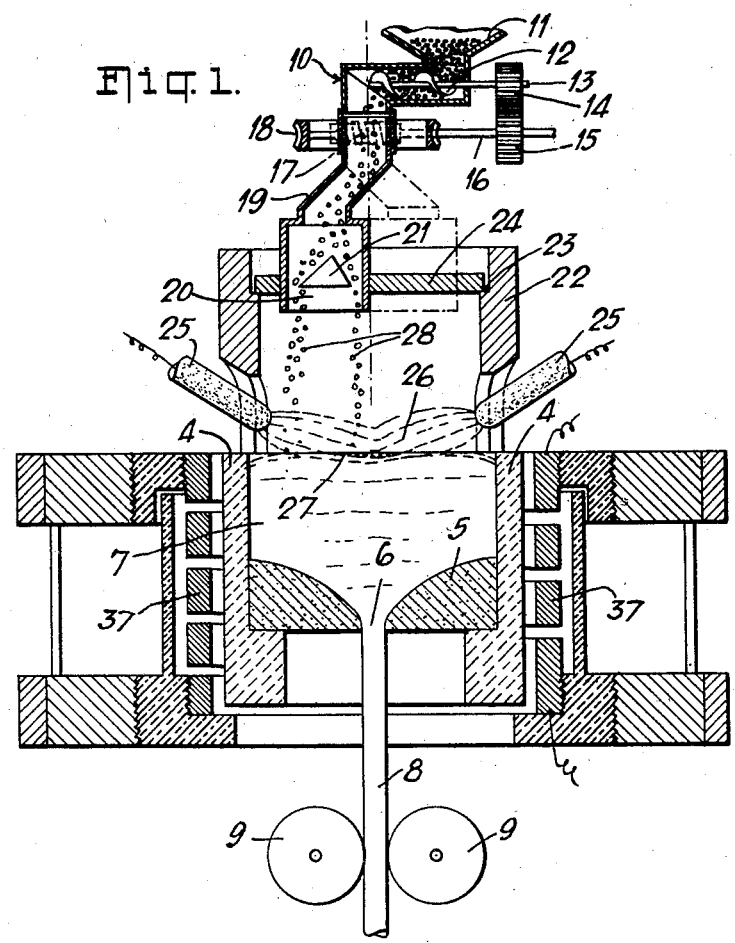
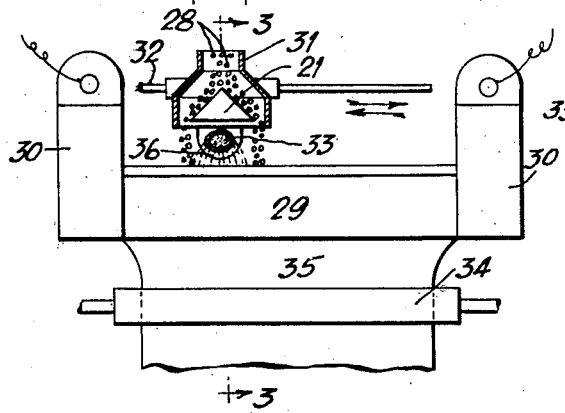
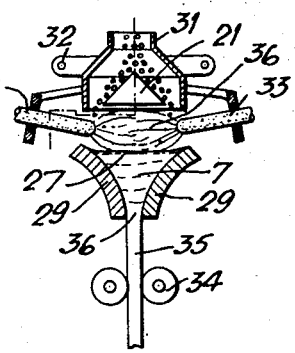
INVENTOR
GASTON DELPECH
BY
Oscar A. Geier
ATTORNEY Patented Mar. 5, 1935

1,992,994

UNITED STATES PATENT OFFICE 1,992,994

METHOD FOR THE MANUFACTURE OF GLASS AND SIMILAR PRODUCTS

Gaston Delpech, Clamart, France, assignor to Societe Anonyme des Manufactures des Glaces & Produits Chimiques de Saint-Gobain, Chauny & Cirey, Paris, France Application February 1, 1933, Serial No. 654,618
In France February 5, 1932

1 Claim. (Cl. 49—77)

The present invention relates to a method and means for the manufacture of glass and similar products and refers more particularly to an electrical device used for treating vitrifiable or glassy substances, and a process of treating such substances.

In prior art containers used for the treatment of glass and other easily liquefiable glassy materials had a number of zones situated side by side. The raw materials supplied to a container were fused in the first zone, while the molten substance was gradually removed from the last zone by means of rollers or some other drawing mechanism. The molten substance was either scooped or poured into the drawing mechanism.

Glassy materials having a greater viscosity, such as molten silica, were manufactured in ingots, i. e., by an intermittent process. It is also known to make finished products by melting superposed layers of the material by means of quartz granules.

Devices of this type are very cumbersome and require a large amount of space due to the fact that the zones are located side by side. A large amount of heat is lost through radiation caused by the side surfaces of the walls surrounding these zones, so that only a small percentage of the total heat is actually utilized for the fusion. The molten substance is not homogeneous since the upper hot portions of said substance are not sufficiently intermixed with the inner colder portions.

An object of the present invention is to eliminate the above disadvantages and to provide a device which will have the least possible loss of heat, and which can be used for treating various glassy or vitrifiable substances, including silica.

Another object is to improve the quality of the manufactured glass or similar products by providing a device for treating glassy or vitrifiable substances in which the greatest possible amount of heat is utilized for the fusion.

A further object is to provide an inexpensive device for the treatment of glassy or vitrifiable substances which will fill the least possible space and in which the processes of fusing and of extracting the glassy material take place one above the other in a single container having a small volume.

Yet another object of this invention is to provide an improved process for the manufacture of glass and similar products by means of which products of uniform quality may be obtained.

The above and other objects of this invention may be realized by providing a process of manufacturing glass and similar products which comprises the feature of depositing solid particles of vitrifiable substances, such as frits or quartz granules, at the top, i. e. at the upper surface of said liquid, a fusion taking place at that surface, and simultaneously removing the lower portions of said liquid by some drawing mechanism, these lower portions being solidified in the form of bars, tubes, plates, or sheets. The liquid situated in the container should be maintained at the same level, i. e. the amount of liquid added by fusion process should be substantially equal to the amount of liquid removed by the drawing mechanism.

My invention also refers to a device used for the manufacture of glass and similar products and comprising a container for the molten glassy substance, which should be as small as possible, and distributing means used to supply to said container predetermined quantities of solid particles of vitrifiable substances, such as frits or quartz granules. A source of heat is adapted to melt these particles and to form a fusion bed at the surface of the molten glassy substance and adjacent thereto, thus refining said substance.

A delivery mechanism which may consist of a number of rollers rotating at a predetermined speed or of a drawing mechanism of a different type is located near the bottom of the container and is regulated to remove from the lower portion of the container an amount of the molten substance which is equal to that produced by the solid particles.

Consequently, the glassy liquid within the container is maintained at the same level, since the amount of solid particles supplied to the upper portion of said liquid is substantially equal to the amount of liquid removed from the lower portion of the container.

The invention will appear more clearly from the following detailed description when taken in connection with the accompanying drawing which illustrates preferred embodiments of the inventive idea.

In the drawing:

Figure 1 is a vertical section through a device illustrating the principles of this invention, and used for the manufacture of silica bars.

Figure 2 shows in side elevation and partly in vertical section a modified form of the inventive idea, used for the manufacture of silica plates, and Figure 3 is a vertical section along the line 3—3 of Figure 2.

The furnace illustrated in Figure 1 of the drawing comprises a container 4 having the shape of a crucible open at the top and provided with a removable bottom 5. An opening 6 is situated in the middle of the bottom 5 and is used for removing molten silica 7, which fills the container 4. The molten silica removed through the opening 6 solidifies in the form of bars 8 which are taken up by rolls 9 rotated at a predetermined regulatable speed.

The distributing device 10 comprises a hopper 11 and a screw conveyor 12 located within said hopper and rotates by a shaft 13. The shaft 13 is driven by a source of power not shown in the drawing and carries a toothed wheel 14 meshing with a toothed wheel 15 carried by a shaft 16. A worm 17 is rotated by the shaft 16 and rotates in its turn a worm gear 18 rigidly connected with a pipe 19. The pipe 19 forms a continuation of the hopper 11 and is provided with a port or an opening 20 located above the container 4. A cone 21 is situated within the pipe 19 adjacent to the opening 20 and is used for evenly distributing the solid particles of vitrifiable substances such as frits, or quartz granules which are introduced into the hopper 11.

A hollow casing 22 is provided with inner shoulders 23 carrying a plate 24 which rotates along with the pipe 19 within the casing 22. The casing 22 surrounds electrodes 25 preferably located on opposite sides of the container 4. These electrodes are preferably of the three-phase type, and are connected to a source of electrical energy not shown in the drawing. The electrodes 25 form an electric arc 26 passing over the upper surface 27 of the molten liquid 7 and melting the granules or solid particles 28 while or just before they come in contact with the surface 27 of the glassy liquid 7. The electric arc 26 will be formed provided that the molten liquid 7 consists of quartz. In the case of molten glass, the electric current will pass through the glass, which is a conductor in the molten state. The side walls of the container 4 are surrounded by an electrical resistance 37 having preferably the shape of a spiral and used for heating the container 4 to a predetermined high temperature.

The furnace shown in Fig. 1 is used for the manufacture of bars. However, it may be easily adapted for the manufacture of elongated hollow articles, such as tubes by providing a piece of a suitable form in the middle of the opening 6.

The device operates as follows:

Granules of solid particles 28 of vitrifiable substances such as frits, or quartz granules, are introduced into the hopper 11. They are conveyed by the screw conveyor 12 into the rotative pipe 19 and fall through this pipe by gravity, passing through the opening 20 and around the cone 21 into the casing 22. These granules come in contact with the electric arc 26 provided by electrodes 25 while, just before or just after they strike the surface 27 of the molten silica 7. Due to the heat provided by the electric arc a fusion takes place at the upper surface 27 of the liquid silica. At the same time the lower cooler portions of the liquid are forced by the weight of the upper portions through the opening 6 and solidify in the form of bars corresponding to the shape of the opening 6. These bars 8 are passed between two rotary rollers 9 which remove them from the device.

The device illustrated in Figures 2 and 3 of the drawing is used for the production of plates made of molten silica. The container for the liquid silica used in this device is formed by converging walls 29 which are preferably made of a carbonaceous material, such as graphite, and are adapted to be heated by an electrical current transmitted to these walls by the end members 30 which are in their turn connected to a source of electrical energy not shown in the drawing. The distributing device 31 is reciprocated along the walls 29 by any suitable means 32. The electrodes 33 are carried by the movable distributing device 31 and are reciprocated together with said device.

Rollers 34 are situated under the walls 29 and are used for removing a silica plate 35 formed at the opening 36 which is located between the converging walls 29.

This device operates in a way similar to that of the device shown in Figure 1:

Quartz granules or similar solid particles 28 pass through the reciprocating tube 31 and around the cone 21, falling on the surface 27 of the molten silica 7. The granules 28 come in contact with the electric arc 36 formed by electrodes 33 just before or while they reach the surface 27 of the liquid 7.

Due to the fact that the electrodes 33 move along with the pipe 31, the fusion will take place evenly and uniformly along the entire surface of the liquid. Lower portions of the liquid are removed through the opening 36 by means of rotating rollers 34, solidifying in the form of a plate 35.

A device constructed in accordance with the principles of this invention is much cheaper and takes much less space than those known in prior art, since it comprises a single container which should preferably be as small as possible and since the processes of fusing the glassy substance and of removing the same take place one above the other within the same container. The amount of lost heat is reduced to a minimum and the costs of maintenance are very small. Products made in the device are of an excellent quality due to the uniformity of the fusing process. Furthermore, the above devices may be easily adapted for the manufacture of articles of a totally different consistency and shape.

Smaller furnaces may be heated solely by means of the resistance 37 (Figure 1) without the use of electrodes 25. In other cases it may be possible to use the electrodes 25 for heating the entire molten substance, thus dispensing with the use of the resistance 37. It is also possible to substitute the rollers 9 or 34 by other drawing means or to dispense with the use of such means entirely. This invention is further described and claimed in my continuation in part application filed December 7, 1934, Serial Number 756,401.

What is claimed is:

In a method of continuously manufacturing fused siliceous material, the steps of melting divided siliceous material, whereby a single mass of a molten siliceous substance having a substantially small volume is formed, adding solid divided siliceous material uniformly over the entire surface of said molten substance, heating said surface by a flame extending over the surface and causing said divided siliceous material to pass through the heating zone of said flame while the latter is being added to said molten substance, whereby a fusion between said solid material and said molten substance takes place along said surface, said solid material being melted and refined by said heat, heating separately the mass of molten siliceous material to maintain it at a predetermined temperature, and removing simultaneously the lower portions of said molten siliceous material substance.

GASTON DELPECH.